United States Patent Office 3,476,453
Patented Nov. 4, 1969

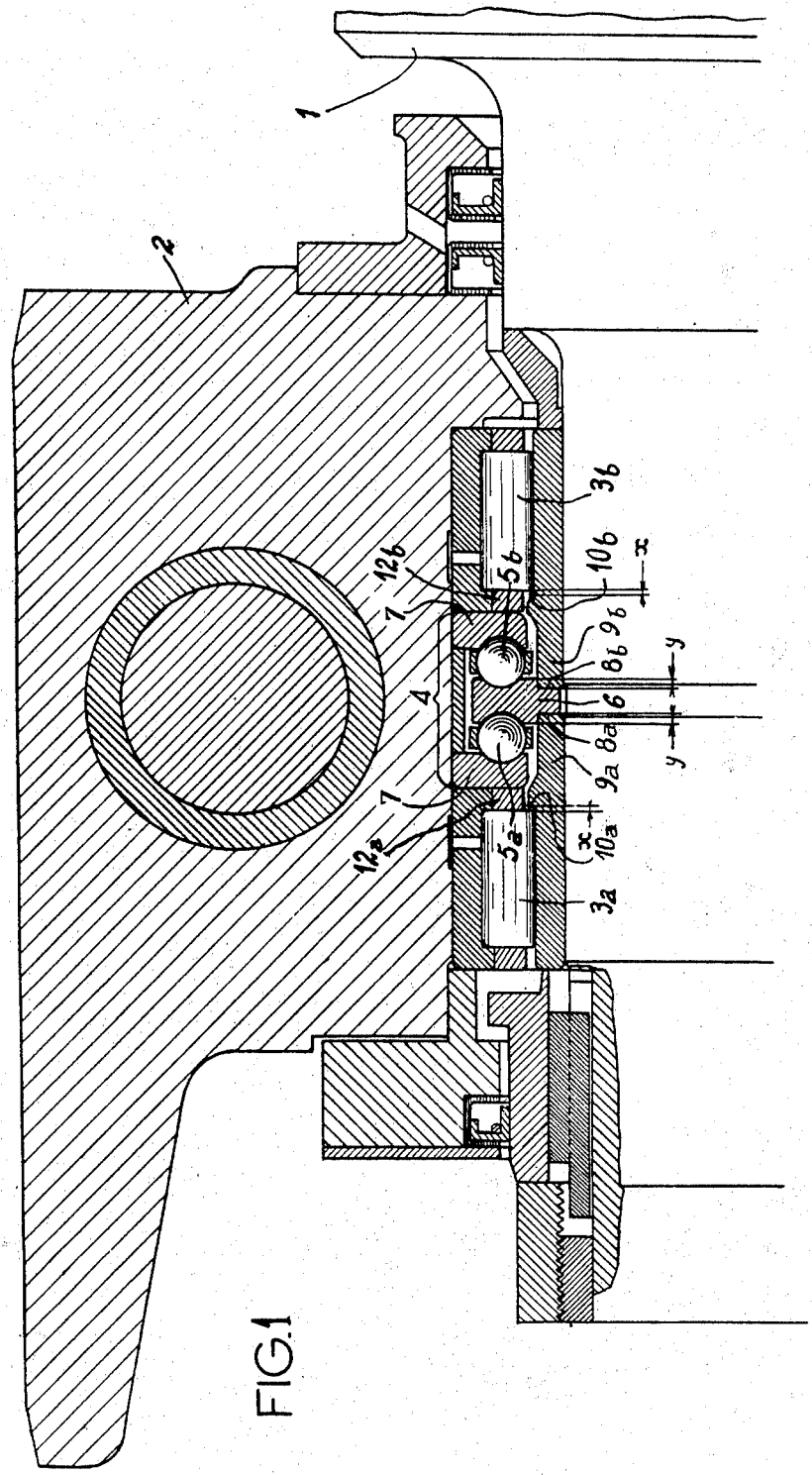

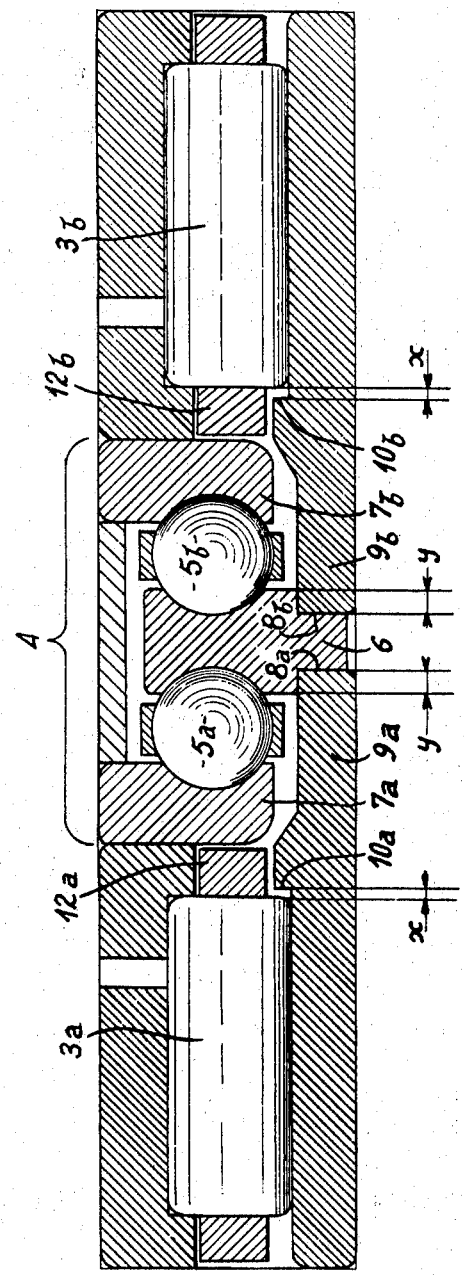

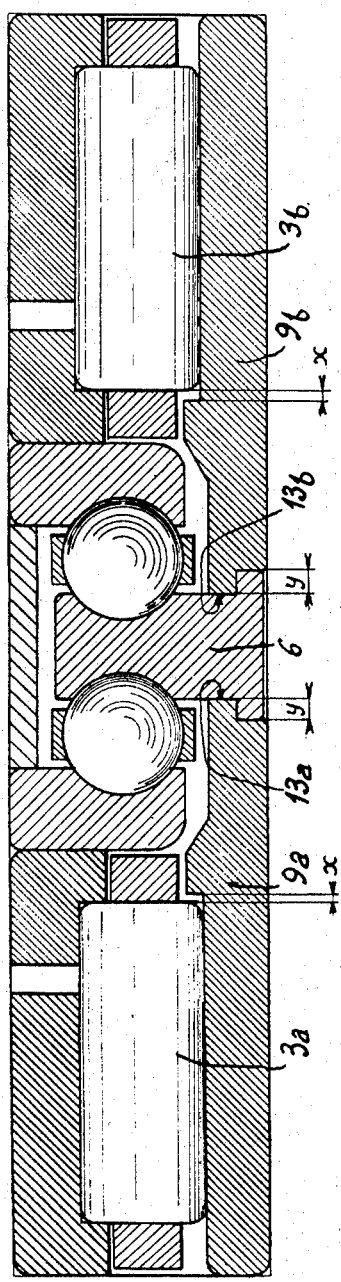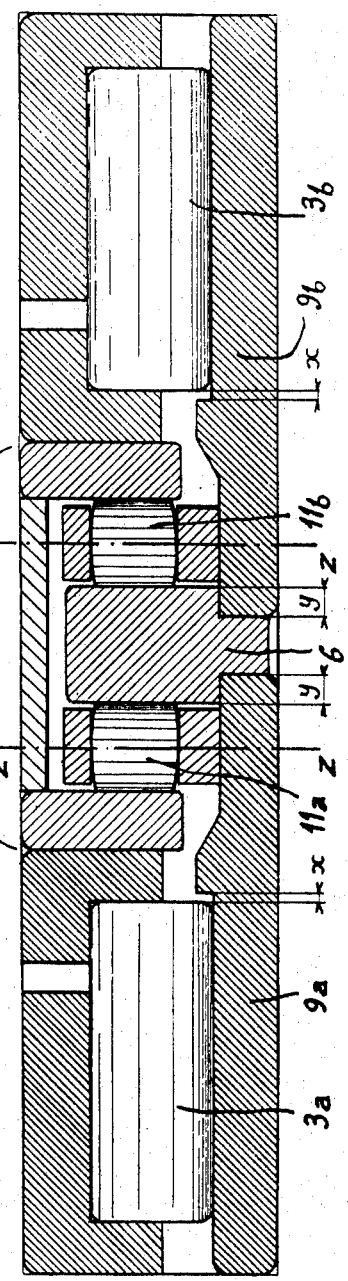

3,476,453
PLUMMER-BLOCKS FOR THE CYLINDERS
OF ROLLING MILLS
René Louis Kastner, Paris, France, assignor to Societe
d'Exploitation des Roulements Roultex, Denis, France
Filed Aug. 9, 1967, Ser. No. 659,501
Claims priority, application France, Dec. 2, 1966,
85,953
Int. Cl. F16c 19/04, 19/10, 19/14
U.S. Cl. 308—174                              5 Claims

ABSTRACT OF THE DISCLOSURE

A bearing for plummer-blocks of rolling-mill cylinders comprises two parallel rows of rollers supported by two rows of internal rings and a central double-acting thrust-bearing interposed between said rollers. The thrust-bearing has a central ring which is provided with grooves in which are engaged the corresponding extremities of said internal rings, and the internal rings abut the central ring and the rollers.

---

The invention relates to plummer-blocks for the cylinders of rolling-mills. It has more particularly for its object a bearing intended to equip devices of this kind.

It will be recalled that the bearings of large dimensions which are fitted on the working or supporting cylinders of rolling-mills are known as "plummer-blocks."

These cylinders are subjected to extremely large external stresses, and the bearings with which the plummer-blocks are provided must be capable of withstanding enormous loads, both axial and radial.

In addition, for obvious reasons, these bearings must lend themselves readily to rapid dismantling and re-assembling operations and must not necessitate any careful and complicated adjustments during the course of these operations.

The present invention has for its object a bearing which fulfills perfectly these various conditions and has the advantage of being able to be adapted to plummer-blocks of known type, without any modifications of these latter being necessary.

In accordance with the invention, this bearing comprises two lateral rows of rollers, separated by a double-acting central thrust member of the ball or roller type. The central thrust member is provided with a central ring having two grooved joints, in which are housed the corresponding extremities of the inner rings of the bearing, the said rings further comprising a shoulder arranged face the extremity of the rollers nearest to the central thrust member.

This bearing is capable of withstanding both high radial loads, by means of its rows of rollers, and high axial loads, balanced by the double-acting central thrust bearing. In addition, the grooves of the central ring of this bearing provide the centering and alignment of the inner rings of the bearing, one with respect to the other.

Finally, the lateral maintenance of the internal rings of the bearing is ensured by the shoulder with which they are provided, the shoulders further retaining all the constituent parts of the bearing in the plummer-block and thus permitting easy assembly or dismantling of the rolling-mill cylinders, the plummer-blocks of which are provided with bearings according to the invention.

Various forms of construction of bearings of this kind will be described below in detail, by way of examples and not in any limitative sense, reference being made to the accompanying drawing, in which:

FIG. 1 is a partial axial section of a first form of construction, mounted in a plummer-block and comprising a central ball thrust-bearing;

FIG. 1a is a partial view on a larger scale of the bearing shown in FIG. 1;

FIG. 2 is a partial axial section of a second form of construction, comprising a central thrust bearing of the roller type; and FIG. 3 is a detail cross-section of an alternative form of construction.

Referring first to FIGS. 1 and 1a, the rolling-mill cylinder and its plummer-block have respectively the references 1 and 2. The bearing proper comprises two parallel rows of rollers 3a and 3b respectively, arranged laterally and separated by a double-acting central thrust-bearing 4. This thrust-bearing comprises balls 5a and 5b, mounted on each side of a central ring 6 and retained by the lateral rings 7a and 7b.

The rollers 3a and 3b withstand the high radial loads to which the bearing is subjected, while simultaneously the central thrust-bearing 4 withstands the axial loads.

In accordance with the invention, the central ring 6 is provided with two grooves 8a and 8b, in which are housed the corresponding extremities of the internal rings 9a and 9b of the bearing. The ring 6 thus ensures the retention, axially and radially, of the internal rings 9a and 9b, and in consequence provides the centering and alignment of these rings with respect to each other.

The internal rings are retained laterally by a single shoulder, 10a and 10b respectively arranged opposite the extremities of the rollers 3a and 3b which are nearest to the central thrust-bearing 4. These shoulders have the advantage of permitting rapid assembly and removal of the plummer-blocks of the rolling-mill cylinders, since they retain all the constituent parts of the bearing in position in the plummer-block.

It will be observed that a clearance $x$ separates the shoulders 10a and 10b from the corresponding extremities of the rollers 3a and 3b. Numerous tests carried out by the applicants with rolling-mill cylinders of different sizes and subjected to variable external forces have shown that it is essential that the distance $x$ should be less than two-thirds of the distance $y$ which represents the depth to which the corresponding internal ring 9a or 9b is engaged in the groove 8a, 8b, and is preferably equal to half the distance $y$. It is solely by observing this condition that there is obtained in all cases a reliable operation of the bearing according to the invention, together with easy assembly and dismantling of the bearing.

In the alternative form shown in FIG. 2, in which the parts described in connection with FIG. 1 have been given the same reference numbers, rollers 11a and 11b, pivoted about a geometric axis Z—Z have been substituted for the balls 5a and 5b of the central thrust-bearing 4. It will also be noted that while the bearing shown in FIG. 1 is provided with cages 12a and 12b for the rollers 3a and 3b, the bearing shown in FIG. 2 does not have these cages, the use of which may or may not have advantages in certain cases which are left to the judgement of those skilled in the art.

In FIG. 3, in which the parts already described have also been given the same references as in FIG. 1, it will be observed that the assembly of the central ring 6 and the rings 9a and 9b is effected by means of grooves 13a and 13b, which are in positions different from the grooves 8a and 8b, but without thereby departing from the scope of the invention.

What I claim is:

1. A bearing for plummer-blocks of rolling-mill cylinders, said bearing comprising two parallel rows of cylindrical rollers having opposite ends, two rows of internal rings supporting said rollers, and a central double-acting thrust-bearing interposed between said rollers, said thrust-bearing comprising a central ring provided with grooves, said internal rings having extremities engaged in corresponding grooves, said internal rings being solely connected at said extremities by engagement in said grooves of said central ring, said internal rings being provided each with a shoulder disposed between said central double-acting thrust-bearing and that end of the associated roller nearest to said central thrust-bearing, said shoulders facing said ends and defining respective spaces therewith each of which is less than two-thirds of the depth of engagement of the corresponding internal ring in the corresponding groove with the internal rings in abutment with the central ring at said grooves.

2. A bearing as claimed in claim 1 wherein the space between each shoulder and the ends of the associated roller is less than one-half of the depth of engagement of the corresponding internal ring in the associated groove in the central ring.

3. A bearing as claimed in claim 1, in which cages are provided for said rollers.

4. A bearing as claimed in claim 1, in which said central double-acting thrust-bearing is a ball-bearing, said balls being disposed on each side of said central ring.

5. A bearing as claimed in claim 1, in which said central double-acting thrust-bearing is a roller-bearing, said rollers being adapted to pivot about an axis perpendicular to said internal rings and being disposed on each side of said central ring.

References Cited

UNITED STATES PATENTS 1,776,647  9/1930  Zubler _____ 308—174

FOREIGN PATENTS 164,363  6/1921  Great Britain.
31,665  7/1933  Netherlands.

MARTIN P. SCHWADRON, Primary Examiner

F. SUSKO, Assistant Examiner